United States Patent [19]

Chen et al.

[11] Patent Number: 4,562,228

[45] Date of Patent: Dec. 31, 1985

[54] POLYMER BLENDS

[75] Inventors: Augustin T. Chen, Cheshire; Kemal Onder, North Haven; Karl W. Rausch, Jr., Hamden, all of Conn.

[73] Assignee: The UpJohn Company, Midland, Mich.

[21] Appl. No.: 727,200

[22] Filed: Apr. 29, 1985

Related U.S. Application Data

[63] Continuation of Ser. No. 584,842, Feb. 29, 1984, abandoned.

[51] Int. Cl.4 .......................... C08L 75/00; C08F 8/30
[52] U.S. Cl. ....................................... 525/66; 525/183
[58] Field of Search .................... 525/66, 183

[56] References Cited

U.S. PATENT DOCUMENTS

| | | | |
|---|---|---|---|
| 3,974,234 | 8/1976 | Brinkmann et al. | 260/857 G |
| 4,065,441 | 12/1977 | Andrews et al. | 260/78 R |
| 4,072,665 | 2/1978 | Onder | 260/78 R |
| 4,087,481 | 5/1979 | Onder | 260/857 TW |
| 4,148,846 | 4/1979 | Owens et al. | 525/66 |
| 4,156,065 | 5/1979 | Onder et al. | 528/51 |
| 4,167,505 | 9/1979 | Dunkelberger | 260/37 N |
| 4,221,879 | 9/1980 | Humme et al. | 525/66 |
| 4,247,665 | 1/1981 | Daniels et al. | 525/421 |
| 4,321,336 | 3/1982 | Meyer et al. | 525/183 |
| 4,338,406 | 7/1982 | Sanderson et al. | 525/66 |
| 4,362,846 | 12/1982 | Korber et al. | 525/66 |
| 4,381,371 | 4/1983 | Nielinger et al. | 525/66 |
| 4,405,748 | 9/1983 | Nielinger et al. | 524/504 |
| 4,423,186 | 12/1983 | Grigo et al. | 525/66 |

Primary Examiner—John C. Bleutge
Assistant Examiner—A. L. Carrillo
Attorney, Agent, or Firm—James S. Rose

[57] ABSTRACT

Blends are provided of (a) certain aromatic-aliphatic polyamides and (b) an impact resistance-enhancing amount of a particulate rubbery impact modifier.

8 Claims, No Drawings

POLYMER BLENDS

This application is a continuation of application Ser. No. 584,842 filed Feb. 29, 1984 now abandoned.

BACKGROUND OF THE INVENTION

1. Field of the Invention

This invention relates to blends containing polyamides and is more particularly directed to blends of certain aromatic-aliphatic polyamides and impact modifiers and to methods of preparation of said blends.

2. Description of the Prior Art

A variety of blends of impact modifiers and polyamides have been described in the prior art. In particular it is known that nylon-6, nylon-6,6 and a series of related polyamides can be blended with various types of polymeric impact modifiers to enhance the impact resistance of these polymers. Illustrative of such blends are those described in U.S. Pat. Nos. 3,974,234; 4,167,505; 4,221,879; 4,247,665; 4,321,336; 4,338,406; 4,362,846; 4,381,371; 4,405,748 and 4,423,186.

A series of polyamides has recently been introduced to the commercial marketplace in which the acid moiety of the polyamide is derived from a mixture of aliphatic dicarboxylic acids or a mixture of an aliphatic and an aromatic dicarboxylic acid and the amine or amide forming moiety is derived from a diamine or diisocyanate which is aromatic in nature. These polyamides are characterized by ease of melt processing, excellent physical properties and, in certain cases, by ease of conversion to the crystalline state. Although these products mainly exhibit good impact resistance, we have now found that this particular property can be significantly increased by introducing into the polymer, as a blend, a minor amount of certain polymeric impact modifiers. We believe that the degree of enhancement of the impact resistance of the polyamides achieved in this manner is significantly greater than would be expected based on the known properties of the two components.

SUMMARY OF THE INVENTION

This invention comprises polymer blends which blends comprise:

(1) a polyamide characterized by a recurring unit of the formula:

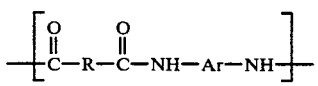     (I)

wherein Ar represents arylene and, in about 30 to about 85 percent of the recurring units, R represents alkylene from 6 to 12 carbon atoms, inclusive, in 0 to about 70 percent of the recurring units R represents m-phenylene, and in 0 to about 50 percent of said recurring units R represents tetramethylene; and (2) an impact resistance-enhancing amount of a particulate rubbery impact modifier.

In particular embodiments of the polymer blends in accordance with the invention the polyamide is either:

A. one in which, in about 70 percent of the recurring units, R represents heptylene and, in the remainder of said recurring units, R represents tetramethylene and the arylene group Ar is

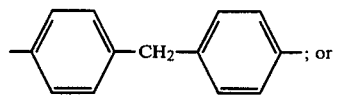

B. one in which, in about 50 percent of the recurring units, R represents heptylene and, in the remainder of said recurring units, R represents m-phenylene and Ar in about 85 percent of the recurring units represents

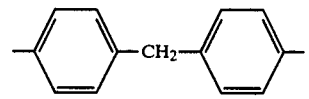

and in the remainder of said recurring units represents tolylene, i.e. a residue of formula

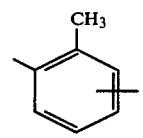

The term "alkylene from 6 to 12 carbon atoms, inclusive" means straight or branched chain alkylene having the stated total number of carbon atoms. Illustrative of alkylene are hexylene, heptylene, octylene, nonylene, decylene, undecylene, dodecylene and isomeric forms thereof.

The term "arylene" means a divalent radical obtained by removing two nuclear hydrogen atoms from an aromatic hydrocarbon and is inclusive of phenylene, tolylene, naphthylene, diphenylylene and methylenebis(phenylene), i.e. a radical of the formula

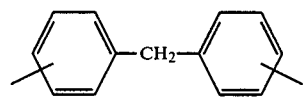

DETAILED DESCRIPTION OF THE INVENTION

The polymer blends of the invention are prepared readily by direct admixture of the individual components in any convenient manner. Illustratively, the components are admixed in comminuted form such as powder or in the form of chips, pellets and the like, using manual mixing or mechanical mixing in appropriate mixing apparatus. The resulting admixture is then homogenized, if desired, by conventional means such as by extrusion using standard extruding equipment. The product is extruded in strand, sheet or like form and the extruded mixture is chopped or pelletized to whatever form is desired for ultimate use.

The proportions in which the two components are brought together can vary over a wide range, the important consideration being that the amount of the impact modifier which is introduced into the mixture is sufficient to produce an impact resistance-enhancing effect. The amount which is necessary to produce this effect will vary depending upon the particular nature of the two components which are employed. In general, the amount which is necessary to produce the impact resistance-enhancing effect is the order of about 5 to about 30 parts by weight per 100 parts of the total polymer blend.

The amount of impact modifier introduced to produce the impact resistance-enhancing effect is that amount which is sufficient to increase the impact resistance of the polyamide by an amount of at least 1.5 foot pounds per inch of notch as measured by the Notched Izod test (ASTM D 256-56). Preferably, the minimum impact resistance-enhancing amount of impact modifier employed is that which will produce an increase in impact strength of at least 3.0 foot pounds per inch of notch measured by the above test. The upper limit on amount of impact modifier introduced is governed partly by economic considerations and partly by consideration for the possible reduction in other physical properties of the polyamide which might be caused by introduction of the amount of modifier in question. In general, the upper limit on the amount of impact modifier introduced is the order of 30 percent by weight based on the blended polymer as set forth above. A particularly useful range of amount of impact modifier is from about 9 to about 16 parts by weight based on 100 parts by weight of blend.

The polyamides characterized by the recurring unit of Formula I, as set forth above, are themselves known in the art and can be prepared by processes which are well-known in the art and which are described in U.S. Pat. Nos. 4,065,441; 4,072,665; 4,087,481 and 4,156,065. As set forth in these patents, the copolyamides employed in the polymer blends of the invention can be made by various techniques including the melt polymerization of the appropriate dicarboxylic acids and appropriate diamines or by the acid chloride process in which the dicarboxylic acid chlorides are reacted with the appropriate amines. Preferably, the polyamides employed in the polymer blends of the invention are made by reaction of the appropriate dicarboxylic acids or mixtures of dicarboxylic acids with the appropriate aromatic diisocyanates or mixtures of aromatic diisocyanates. Full details of these processes are given in the aforesaid patents and will not be repeated here.

Illustrative of the polyamides which can be employed in the blends of the invention are:

1. polyamides characterized by the recurring unit of formula (I) above in which Ar represents arylene [preferably 4,4'-methylenedi(phenylene)] and, in 60 to 85 percent of said units, R is alkylene from 7 to 12 carbon atoms and, in the remainder of said units, R is m-phenylene;

2. polyamides characterized by the recurring unit of formula (I) above in which Ar represents arylene [preferably 4,4'-methylenedi(phenylene)] and, in 50 to 85 percent of said units, R is alkylene from 6 to 10 carbon atoms and, in the remainder of said units, R is tetramethylene; and 3. polyamides characterized by the recurring unit of formula (I) above in which, in about 30 to 60 percent of said units, R is alkylene from 7 to 12 carbon atoms and, in the remainder of said units, R is m-phenylene, and, in about 70 to about 95 percent of said units, Ar is 4,4'-methylenebis(phenylene) and, in the remainder of said units, Ar is tolylene. Preferably those units in the polyamide in which Ar represents tolylene are also those in which R is m-phenylene.

Particularly preferred polyamides include those of the group 2 above in which R in about 70 percent of the recurring units represents heptylene and Ar is 4,4'-methylenebis(phenylene) in all the units, and those of group 3 in which R in about 50 percent of the recurring units represents heptylene and Ar in about 85 percent of the recurring units represents 4,4'-methylenebis(phenylene) and, in the remainder of said units, Ar represents tolylene.

The impact modifiers which are employed in the polymer blends of the invention are the non-halogen containing particulate rubbery impact modifiers which are well-known in the art and which have been employed particularly to impart improved impact properties to polyvinyl chloride and related polymers; see, for example, Encyclopedia of Polymer Science and Technology, Vol. 14, pages 417–418, 1971, Interscience Publishers, New York. Illustrative of such modifiers are acrylonitrile-butadiene-styrene terpolymers, methylmethacrylate-butadiene-styrene terpolymers, ethylene-vinylacetate copolymers, polyethylene, poly(alkyl acrylates), acrylic multiphase composite interpolymers, and the like.

A particularly preferred group of impact modifiers for use in the blends of the invention is inclusive of methacrylate-butadiene-styrene copolymer rubbers, acrylonitrile-butadiene-styrene copolymer rubbers and acrylic multiphase composite interpolymers.

The term "acrylic multiphase composite interpolymers" is used herein to encompass those multiphase composite interpolymers which comprise a first elastomeric phase polymerized from monomer systems comprising a major portion of an alkyl acrylate ($C_1$–$C_6$) and minor amounts, up to 5 percent by weight, of a crosslinking monomer which is preferably an ester of acrylic or methacrylic acid and up to 5 percent by weight of a graft-linking monomer which is usually an allyl ester of acrylic, methacrylic, maleic, or fumaric acids. Grafted on to this polymer is a rigid acrylate or methacrylate-based thermoplastic phase free of epoxy groups which phase has been polymerized in the presence of the first elastomeric phase described above. These types of interpolymers are described, together with methods for their preparation, in, for example, U.S. Pat. No. 4,096,202. Illustrative of such interpolymers is the product which is available commonly under the trade name of Acryloid ®KM-330.

The polymer blends of the invention can also have incorporated therein any of the various additives such as fillers, antioxidants, pigments, fire retardants, plasticizers, reinforcing agents and the like which are commonly employed in the art in such compositions.

The blends of the invention retain all the excellent physical properties of the polyamides from which they are derived together with the ease of processing which characterizes these materials. The blends exhibit greatly enhanced impact resistance as compared with the polyamides from which they are derived. Accordingly, the polyamide blends of the invention are useful for all the purposes for which the polyamides themselves have been employed or can be employed and give products which have an enhanced resistance to deformation by impact. Illustrative of the uses to which the copolyamide blends can be applied are the preparation of bushings, seal faces, electric insulators, compressor vanes and impellers, pistons and piston rings, gears, thread guides, cams, break linings, clutch faces, abrasive articles and the like.

The following examples describe the manner and process of making and using the invention and set forth the best mode contemplated by the inventors of carrying out the invention but are not to be construed as limiting.

EXAMPLE 1

The polyamide employed in this Example was prepared using the procedure described in U.S. Pat. No. 4,156,065 and employing the following reactants and proportions (all parts by weight):

| | |
|---|---|
| Azelaic acid | 65.30 parts (0.694 equiv.) |
| Adipic acid | 21.90 parts (0.30 equiv.) |
| Stearic acid | 1.71 parts (0.006 equiv.) |
| 4,4'-methylenebis(phenyl isocyanate) | 125 parts (1.0 equiv.) |
| Tetramethylene sulfone | 600 parts |
| 1,3-dimethyl-3-phospholene-1-oxide | 0.5 parts |

The resulting polyamide had an inherent viscosity (0.5 percent+0.5 percent lithium chloride in dimethylformamide) of 0.77 at 30° C. and was characterized by a recurring unit of formula (I) in which Ar represents 4,4'-methylenebis(phenylene) and, in about 70 percent of the units R is heptylene, and, in the remainder, is tetramethylene.

Aliquots of the polyamide so prepared were then used to prepare two blends with an acrylonitrile-butadiene impact modifier (Krynac 5075: Polysar Ltd.). In Blend A the proportions were 90 parts of polyamide:10 parts of impact modifier and in Blend B the proportions were 85 parts of polyamide:15 parts of impact modifier. The blends were prepared by shaking the components together in a paper bag and then melt extruding the resulting mixture using a C. W. Brabender extruder, equipped with a compounding screw consisting of 21 flights with a compression ratio of 3/1 and the equivalent of 4 flight-lengths of intensive mixing, using a barrel temperature of 260° C. The extruded strand was cooled in air and then chopped mechanically into small pieces before being dried overnight at 110°–120° C. The resulting product was then injection molded into test bars using an Arburg machine at an injection pressure of ca $10^4$ psi using temperatures of 250° C. (zone 1), 255° C. (zone 2) and 260° C. (zone 3). Test bars from Blends A and B and corresponding test bars prepared under identical conditions from the starting polyamide alone were then submitted to testing for physical properties. The results of these tests are set forth in Table I below.

TABLE I

| Property | Polyamide | Blend A | Blend B |
|---|---|---|---|
| [1]Tensile Strength: psi | | | |
| Yield | 10,150 | 8870 | 7620 |
| Break | 11,520 | 10,490 | 8160 |
| [1]Elongation: % | | | |
| Yield | 8.0 | 8.2 | 7.7 |
| Break | 125.0 | 120 | 90 |
| [1]Tensile Modulus: psi | 238,200 | 219,200 | 194,600 |
| Notched Izod Impact: ⅛" ft. lbs/in. | 2.90 | 4.7 | 7.3 |

[1]ASTM D638-68

EXAMPLE 2

Using the procedure, and the same polyamide starting material, described in Example 1 but replacing the impact modifier there used by an acrylic multiphase composite interpolymer [Acryloid KM-330: Rohm and Haas: believed to be based on n-butyl acrylate, 1,3-butylene diacrylate, dialkyl maleate and methyl methacrylate and to be produced according to Example 26 of U.S. Pat. No. 4,096,202] there were prepared two additional blends according to the invention. Blend C was prepared from 90 parts by weight of polyamide and 10 parts by weight of impact modifier and Blend D was prepared from 85 parts by weight of polyamide and 15 parts by weight of impact modifier. Test bars were prepared from these blends using the procedure described in Example 1. The physical properties determined on the test bars are set forth in Table II below.

TABLE II

| Property | Polyamide | Blend C | Blend D |
|---|---|---|---|
| Tensile strength: psi | | | |
| Yield | 10,150 | 8720 | 7960 |
| Break | 11,520 | 9660 | 8780 |
| Elongation: % | | | |
| Yield | 8.0 | 7.8 | 7.7 |
| Break | 125.0 | 100 | 100 |
| Tensile Modulus: psi | 238,200 | 240,400 | 226,800 |
| Notched Izod Impact: ⅛" ft. lbs/in. | 2.90 | 13.0 | 15.0 |

EXAMPLE 3

The polyamide used in making blends in accordance with this Example was prepared utilizing the process described in U.S. Pat. No. 4,156,065 Example 12 but employing the following reactants and proportions (all parts by weight).

| | |
|---|---|
| Azelaic acid | 47.07 parts (0.5 equiv.) |
| Isophthalic acid | 41.17 parts (0.496 equiv.) |
| Benzoic acid | 0.49 parts (0.004 equiv.) |
| 4,4'-methylenebis(phenyl isocyanate) | 106.25 parts (0.85 equiv.) |
| 2,4-toluene diisocyanate | 13.05 parts (0.15 equiv.) |
| 1,3-dimethyl-3-phospholene-1-oxide | 0.5 parts |
| Tetramethylenesulfone | 500 parts |

The resulting polyamide had an inherent viscosity (0.5 percent+0.5 percent lithium chloride in dimethylformamide) of 0.80–0.86 at 30° C. and was characterized by a recurring unit of formula (I) in which, in 50 percent of the units, R represents heptylene and, in the remainder, represents m-phenylene, and, in 85 percent of the units, Ar represents 4,4'-methylenebis(phenylene) and, in the remainder, represents 2,4-tolylene.

A Blend (Blend E) was prepared from 90 parts by weight of the above polyamide and 10 parts by weight of Acryloid KM-330 using the procedure described in Example 1 utilizing a Brabender extruder. The resulting blend was then injection molded to prepare test bars in accordance with the procedure described in Example 1. The physical properties determined on the test bars and on test bars prepared in exactly the same manner from the polyamide starting material are set forth in Table III below.

TABLE III

| Property | Polyamide | Blend E |
|---|---|---|
| [1]Flexural Strength: psi | 17,020 | 14,380 |
| [1]Flexural Modulus: psi | 325,100 | 307,600 |
| Izod Impact ⅛": ft. lbs/in. | | |
| Notched: | 1.44 | 4.77 |
| Unnotched: | — | 40.11 |
| [2]Heat Deflection Temp. | | |

TABLE III-continued

| Property | Polyamide | Blend E |
| --- | --- | --- |
| 264 psi: °C. | 136 | 107 |

[1]ASTM-D790
[2]ASTM D 648-56

We claim:
1. A polymer blend which comprises:
(1) a polyamide characterized by a recurring unit of the formula

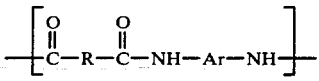   (I)

wherein Ar represents arylene and, in about 30 to about 85 percent of the recurring units, R represents alkylene from 6 to 12 carbon atoms, inclusive, in 0 to about 70 percent of the recurring units R represents m-phenylene, and in 0 to about 50 percent of said recurring units R represents tetramethylene; and (2) an impact resistance-enhancing amount of an acrylic multiphase composite interpolymer consisting of a first elastomer phase polymerized from a major proportion of a $C_1$ to $C_6$ alkyl acrylate with up to 5 percent by weight of a crosslinking monomer which is an ester of acrylic or methacrylic acid and up to 5 percent by weight of a graft-linking monomer which is an allyl ester of an acid selected from the group consisting of acrylic, methacrylic, maleic, and fumaric acids, and, grafted on to said first elastomeric phase a rigid acrylate or methacrylate-based thermoplastic phase free of epoxy groups which thermoplastic phase has been polymerized in the presence of the first elastomeric phase.

2. A polymer blend according to claim 1 wherein said polyamide is characterized in that, in about 60 to about 85 percent of the recurring units, R represents alkylene from 7 to 12 carbon atoms, inclusive, and, in the remainder of said recurring units, R is m-phenylene, and Ar represents 4,4'-methylenebis(phenylene).

3. A polymer blend according to claim 1 wherein said polyamide is characterized in that, in about 30 to about 60 percent of the recurring units, R represents alkylene from 7 to 12 carbon atoms, inclusive, in the remainder of said recurring units R is m-phenylene, in about 70 to about 95 percent of said recurring units Ar represents

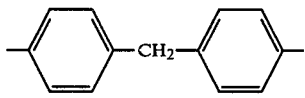

and in the remainder of said recurring units Ar is tolylene.

4. A polymer blend according to claim 1 wherein said polyamide is characterized in that, in about 50 to about 85 percent of the recurring units, R represents alkylene from 6 to 10 carbon atoms, inclusive, and, in the remainder of said recurring units, R represents tetramethylene, and Ar represents 4,4'-methylenebis(phenylene).

5. A polymer blend which comprises:
(1) a copolyamide characterized by a recurring unit of the formula

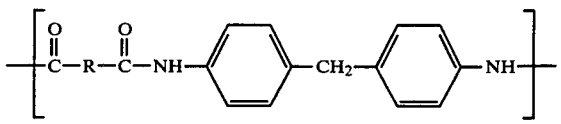

wherein, in about 70 percent of the recurring units, R represents heptylene and, in the remainder of said recurring units, R represents tetramethylene; and (2) an impact resistance-enhancing amount of an acrylic multiphase composite interpolymer consisting of a first elastomer phase polymerized from a major proportion of a $C_1$ to $C_6$ alkyl acrylate with up to 5 percent by weight of a crosslinking monomer which is an ester of acrylic or methacrylic acid and up to 5 percent by weight of a graft-linking monomer which is an allyl ester of an acid selected from the group consisting of acrylic, methacrylic, maleic, and fumaric acids, and grafted on to said first elastomeric phase a rigid acrylate or methacrylate-based thermoplastic phase free of epoxy groups which thermoplastic phase has been polymerized in the presence of the first elastomeric phase.

6. A polymer blend according to claim 5 wherein the amount of impact modifier employed is within the range of about 5 to about 30 parts by weight per 100 parts by weight of blend.

7. A polymer blend which comprises:
(1) a copolyamide characterized by a recurring unit of the formula

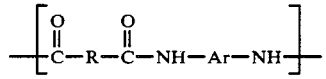

wherein, in about 50 percent of the recurring units, R represents heptylene and, in the remainder of said recurring units, R represents m-phenylene, and, in about 85 percent of said recurring units, Ar represents

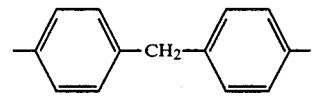

and in the remainder of said recurring units Ar represents tolylene; and (2) an impact resistance-enhancing amount of an acrylic multiphase composite interpolymer consisting of a first elastomer phase polymerized from a major proportion of a $C_1$ to $C_6$ alkyl acrylate with up to 5 percent by weight of a crosslinking monomer which is an ester of acrylic or methacrylic acid and up to 5 percent by weight of a graft-linking monomer which is an allyl ester of an acid selected from the group consisting of acrylic, methacrylic, maleic, and fumaric acids, and grafted on to said first elastomeric phase a rigid acrylate or methacrylate-based thermoplastic phase free of epoxy groups which thermoplastic phase has been polymerized in the presence of the first elastomeric phase.

8. A polymer blend according to claim 7 wherein the amount of impact modifier employed is within the range of about 5 to about 30 parts by weight per 100 parts by weight of blend.

* * * * *

UNITED STATES PATENT AND TRADEMARK OFFICE
CERTIFICATE OF CORRECTION

PATENT NO. : 4,562,228

DATED : December 31, 1985

INVENTOR(S) : Augustin T. Chen, Kemal Onder and Karl W. Rausch, Jr.

It is certified that error appears in the above-identified patent and that said Letters Patent is hereby corrected as shown below:

On the Title Page:

Under the Assignee section [73] "The Upjohn Company" should read -- The Dow Chemical Company --.

Signed and Sealed this

Twenty-fourth Day of March, 1987

Attest:

DONALD J. QUIGG

Attesting Officer      Commissioner of Patents and Trademarks